United States Patent [19]
Meier

[11] Patent Number: 5,430,447
[45] Date of Patent: Jul. 4, 1995

[54] PROTECTION AGAINST MANIPULATION OF BATTERYLESS READ/WRITE TRANSPONDERS

[75] Inventor: Herbert Meier, Moosburg, Germany

[73] Assignee: Texas Instruments Deutschland GmbH, Freising, Germany

[21] Appl. No.: 110,454

[22] Filed: Aug. 23, 1993

[51] Int. Cl.[6] .......................... G01S 13/78; H04L 9/32
[52] U.S. Cl. ........................................ 342/51; 342/44; 380/23; 340/825.34; 340/825.54
[58] Field of Search ...................... 380/23; 342/51, 44; 340/825.34, 825.54

[56] References Cited

U.S. PATENT DOCUMENTS

| | | | |
|---|---|---|---|
| 5,022,080 | 6/1991 | Durst et al. | 380/23 |
| 5,144,667 | 9/1992 | Pogue, Jr. et al. | 380/45 |
| 5,164,732 | 11/1992 | Brockelsby et al. | 342/44 |
| 5,191,610 | 3/1993 | Hill et al. | 380/21 |
| 5,257,011 | 10/1993 | Beigel | 340/572 |
| 5,310,999 | 5/1994 | Claus et al. | 380/23 |

Primary Examiner—Gilberto Barrón, Jr.
Attorney, Agent, or Firm—Rebecca Mapstone; James C. Kesterson; Richard L. Donaldson

[57] ABSTRACT

A hardware and software solution for providing a tamper-proof, batteryless, remote transponder which will only be programmable by an authorized user is disclosed. This goal is achieved through the use of a hardware Cyclic Redundancy Check (CRC) generator which checks during a WRITE function of the data that is received from the Reading/Writing (R/W) unit and also generates several protection bits (Block Check Character; BCC) which are sent back during the response function (READ). Before the CRC generator checks the data during a WRITE function, however, it must be set to a predetermined start value called a Segment Code, and the Segment Code of the R/W unit must be the same as the Segment Code of the transponder in order for a Write (or a READ) to be performed. Additionally, programming of the Selective Address must be done within a predetermined time window (has a predetermined Time Code). If either the Selective Address or the BCC generated by the CRC generator is incorrect, the transponder will be discharged such that it will not respond. In addition, if the R/W unit detects that the Selective Address is being programmed at a time other than the predetermined Time Code, the reader makes the transponder inoperative in yet another way.

10 Claims, 2 Drawing Sheets

PROTECTION AGAINST MANIPULATION OF BATTERYLESS READ/WRITE TRANSPONDERS

FIELD OF THE INVENTION

This invention describes a procedure and circuit arrangement which protects against data manipulation of passive transponders in RF-ID systems.

BACKGROUND OF THE INVENTION

RF-ID systems in the past, which may use batteryless or passive transponders, which depend upon the rectification of the interrogation signal for power, have mainly been comprised of transponders with read-only capability. The transponders were constrained in size, to facilitate implantation, for example, in animals, and in cost to keep manufacture expenses at a minimum. However, the applications for RF-ID systems continued to grow and with it, technical demands for a better, more improved RF-ID system.

One major improvement to the existing RF-ID systems, was the implementation of a Read-Write transponder. With Read/Write capability, numerous applications arose such as airline baggage tracking, warehouse goods tracking, and assembly line piece part tracking. One growing area of interest in Read/Write applications is in security access and toll applications which require remote Read and Programing(Write) functionality. Remote Read and Programing transponders are, however, prone to being tampered with due to the potential gain of succeeding, i.e. unauthorized access to a secure area or free passage through a toll booth. Data security and protection against data manipulation are essential in these applications.

SUMMARY OF THE INVENTION

The object of the invention is to eliminate the above-mentioned problems and provide a tamper-proof, batteryless, remote transponder which will only be programmable by an authorized user. This goal is achieved through the use of a hardware Cyclic Redundancy Check (CRC) generator which checks during a WRITE function the data that is received from the Reading/Writing (R/W) unit and also generates several protection bits (Block Check Character; BCC) which are sent back during the response function (READ). Before the CRC generator checks the data during a WRITE function, however, it must be set to a predetermined start value called a Segment Code, and the Segment Code of the R/W unit must be the same as the Segment Code of the transponder in order for a Write (or a READ) to be performed. Furthermore, a Selective Addressing function is provided. The programming of the Selective Address must be done within a predetermined time window (has a predetermined Time Code). If either the Selective Address or the BCC generated by the CRC generator is incorrect, the transponder can be discharged such that it will not respond. In addition, if the R/W unit detects that the Selective Address is being programmed at a time other than the predetermined Time Code, the reader makes the transponder inoperative in yet another way.

BRIEF DESCRIPTION OF THE DRAWINGS

The invention will be explained in greater detail with reference to an example of an embodiment shown in the drawings, in which.

DESCRIPTION OF THE PREFERRED EMBODIMENTS

Figure 1:
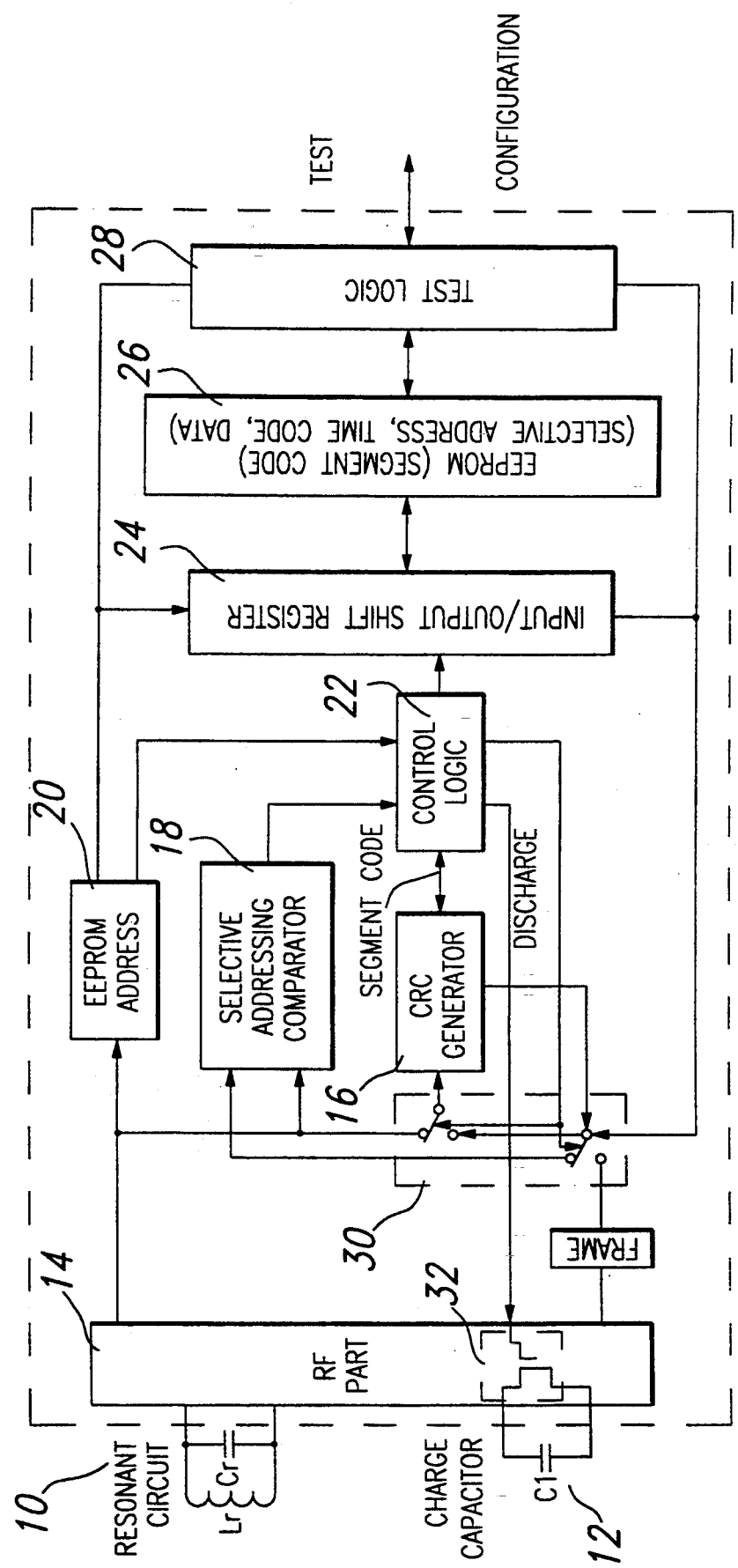
FIG. 1 shows a schematic diagram of the manipulation-protected transponder.

Batteryless transponders which have a contactless Selective Read and Selective Programming function, are used in security access and toll applications. Data security and protection against manipulation or tampering are essential in this case. A suggested solution describes a procedure and a circuit arrangement, which realizes a high degree of data protection. This system is usable with transponders which use a separate charge and response phase.

The protection-against-manipulation transponder contains a hardware CRC generator 16 which checks the data that is received from the R/W unit (not shown) during a Programming and Read function and also generates several protection bits, BCC characters, which are sent back during the response function (READ). Before the CRC generator 16 checks the data or starts to generate a BCC, it must be set to a predefined start value called a Segment Code. In addition, for an accurate WRITE (Programming) and READ function, the CRC generator in the R/W unit and the CRC generator in the transponder must not only use the same CRC algorithm, but also must use the same Segment Code. If the R/W unit uses a different Segment Code than the transponder does, the end value of the CRC generator is not zero, the transponder will discharge its capacitor (no response). Because of the more than 65K possibilities of the Segment Code, it is extremely difficult for a manipulator to find the correct one, especially because the Segment Code is not directly included in the data format. Segment Codes can be selected to differentiate, for example, each market segment of an organization, or each different application within a particular market segment, or to even differentiate customers.

The Segment Code in the transponder can be modified and fixed contactless during a programming function either in production or in the user application, and cannot be modified or READ after it is fixed. This characteristic prevents unauthorized users from changing the Segment Code to a code only they will recognize such that they can program and READ the transponder (and others cannot) as well as prevents unauthorized users from determining what the authorized users Segment Code is such that they can program and READ the transponder unauthorized.

The Segment Code in the R/W unit can be protected against manipulation using on-chip microcomputers or Programmable Read-Only Memory (PROM) circuits. Additionally, the Segment Code in the transponder is protected by storing the Segment Code in an Electrically Erasable Programmable Memory (EEPROM) 26 which can be locked (fixed) using another EEPROM cell. Programming or locking functions are provided for the EEPROM cell, but no function is provided for unlocking the EEPROM cell. The Control Logic circuit 22 controls access to the Segment Code. Manipulation trials where a user tries to unlock the EEPROM will either destroy the transponder physically when the manipulator tries to open the housing of the transponder, or the memory content will change to an undefined value so that the memory is no longer readable. An alternative to storing the Segment Code in an EEPROM is to store the Segment Code in a programmed mask or a ROM programmed Segment Code. Both alternatives offer enhanced manipulation security due to the inalterable characteristics of this type of storage, however, also offer much less flexibility for the same reason.

To prevent discovery of the transponder data format (and BCC) by a READ of the Transponder by an unauthorized user, the transponder comprises a Control Logic circuit 22 which is equipped with a Discharge Function as shown in FIG. 1. If the transponder is charged only (CHARGE) or if wrong data is written into the transponder (see FIGS. 2 and 3), the Control Logic circuit 22 will detect this and will therefore initiate the discharge of the charge capacitor Cl of the transponder, which results in no response signal being sent back to the interrogator by the transponder. In this way, discovery of response data formats is prohibited. If after the CHARGE phase, data is received with the correct number of bits, the transponder will check if the CRC generator 16, through which all received bits are shifted, has a predetermined end value, i.e. zero. If the CRC generator 16 does have a predetermined value, then the R/W unit has sent a Frame BCC which relates to the EEPROM Address and EEPROM data, (i.e. Selective Address and eventually time code and data) of the transponder.

An Application Specific R/W Unit is a R/W unit which reads or programs only certain types of transponders, i.e. either security access transponders or toll-tag transponders, etc. It is impossible to read or program a transponder used for animal identification, with a reader built for security access. To make it more complicated for people who try to manipulate with an Application Specific R/W Unit (ASRW), which inherently already knows the Segment Code due to it's application specific nature, an Addressing Function is provided in the transponder.

Therefore, even if a manipulator has discovered the correct Segment Code or uses a ASRW unit with the correct Segment Code, he must, in addition, determine the Selective Address. The Selective Address is a kind of password and can be defined and eventually be permanently stored by the authorized transponder user in one location of the transponder's memory. The transponder will not respond or program unless the correct Selective Address is sent to and received by the transponder. Otherwise, the transponder will discharge itself. The Selective Address can be different for all transponders in an application or can be the same for all transponders in an application. In any case, the reader or the host computer must know the predetermined Selective Address to have access to the Read, Program, or Lock functions within the transponder.

A portion of the programmable data bits in the EEPROM circuit 20 are used as the Selective Address. This address can be modified by the authorized user, but the reader will only program a new Selective Address if the old Selective Address matches with a Time Code, which is stored in another portion of the EEPROM data within the transponder. For example, in a security access application, an unauthorized user discovers what the Selective Address is and tries to modify the Selective Address at the wrong time interval. The reader checks the time code in the transponder and detects the discrepancies in the times and will automatically reprogram the Selective Address to an incorrect value and will deny access to whichever area is being secured.

Similarly, if the Selective Address is modified illegally using an Application Specific R/W Unit, the difference between the Selective Address and Time Code can be recognized at, for example, a toll station, and an alarm can be initiated or the transponder data can be destroyed contactless.

To better illustrate the system, an example is described. In a security access application, all transponders have the same Selective Address. The reader or host computer automatically changes the Selective Address each week. The computer remembers both Selective Addresses and the time (TIME CODE) when both Selective Addresses became effective. If a transponder is not read at least once in two weeks it will become deactivated. Therefore, only two Selective Addresses together with the two Time Codes are valid. In order to read the transponder, the reader transmits the Write protocol shown in FIG. 3, alternatively transmitting both Selective Addresses. When the transponder has neither of these Selective Addresses stored in it's memory, the transponder will not respond and access to the secured room is denied. Because the Selective Address changes every week, the transponder can only open the door for a maximum of two weeks if the Selective Address is not renewed. A new Selective Address and Time Code is only programmed in the transponder by the door reader, when one of the Selective Addresses and the related Time Codes are in the transponder memory. If after two weeks the Selective Address is not used by the door reader, the transponder will not respond to the reader and therefore access will be denied.

If a manipulator tries to discover the Selective Address by programming the transponder with an ASWR unit to random Selective Addresses, and the manipulator successfully discovers the correct Selective Address, the transponder will respond to the door R/W unit. However, the R/W unit will now detect, with a very high probability, the wrong Time Code, which does not match the Time Code stored in the R/W unit's memory. Upon detection, the R/W unit immediately reprograms the transponder with an invalid Selective Address or with a wrong Data BCC and locks these memory locations in the transponder. The transponder will be worthless or inoperative due to this. If it's desirable for the transponder to be operable for a longer period, either the time intervals for reprogramming the Selective Address and the corresponding Time Code or the number of valid Selective Addresses and corresponding Times Codes stored in the reader must be extended.

A second somewhat different embodiment of the system is described. Each transponder in an application is equipped with one memory location (page) which contains an unalterable unique Selective Address. This page can be read by a charge-only read as read-only transponders operate. There are other locations (pages) of the transponder. For example, these pages contain data that represent fare for a bus and are protected by the circuits described above. These pages can only be read, programmed or locked, when the correct Segment Code is used by the R/W unit as a start value for the CRC generator and the correct Selective Address is transmitted by the R/W unit.

Let us suppose, that a manipulator knows that two transponders can be programmed to the same value if they are within programming range of the reader while the fare is reprogrammed to a discounted value. The value of the transponder must be read before being programmed to a lower value. So, the manipulator tries to fill up an empty transponder using a full transponder by moving both through the antenna field, in order to copy the full transponder value to the empty transponder. In other words, the manipulator tries to move the transponders through the field such that only the full transponder is read, but also such that both transponders are within the field during reprogramming to the reduced value.

The manipulator will not succeed when the Selective Addressing Feature is used. The R/W unit reads the Selective Addresses of the full transponder by addressing the affected page. For programming, the reader has to send the Selective Address to the transponder and the transponder must have a Selective Address match with the reader, otherwise programming is denied. Therefore, because the empty transponder has a different Selective Address, the reader will neither read nor program the empty transponder.

An illustration of the system as related to FIG. 1 follows. When the transponder resonant circuit 10 is in the electromagnetic field of the R/W unit, the resonant circuit is enhanced to oscillate with the R/W unit frequency. Previously to transmitting, the R/W unit generates a BCC by shifting the desired EEPROM address, the Selective Address and the corresponding Time Code and data through it's CRC generator. The received RF voltage is rectified by the RF part of the transponder integrated circuit (IC) 14 and the energy is stored in the charge capacitor C1 during the Charge phase, which is necessary to power up the transponder for either a Read or Programming function (see Programming and Read function FIGS. 2 and 3). The RF part 14 also demodulates the data received during the WRITE phase of either the Read or Programming functions, which occurs when the R/W unit transmits commands, addresses, data and BCCs to the transponder. Initially, switch 30, controlled by the Control Logic circuit 22, connects the output of the Input/Output (I/O) shift register circuit 24 to the input of the Selective Addressing Comparator circuit 18 and the input of the CRC generator circuit 16, to the RF part output.

Depending upon the application, different selective addressable transponders may be used. For example, one transponder can provide both the Selective Read function (Command=Selective Read) and a General Read function (Command=Read). A different transponder may exclusively have the Selective Read function and no General Read function. Yet another transponder may have Selective Programming and allow no programming without a Selective Address. So, depending upon the type of transponder used and the command received from the interrogator, i.e. a certain Write data format of which the length and plausibility is verified, the transponder decides what and if a function is executed.

The Selective Addressable transponder is typically a multi-page transponder within which the EEPROM is organized in blocks. Each block (page) has multiple bits. Generally, only one page can be read or programmed at a time. Therefore, the desired page must be addressed by a Page Address. The EEPROM Address circuit 20 comprises the Page Address and the Command.

Figure 2:
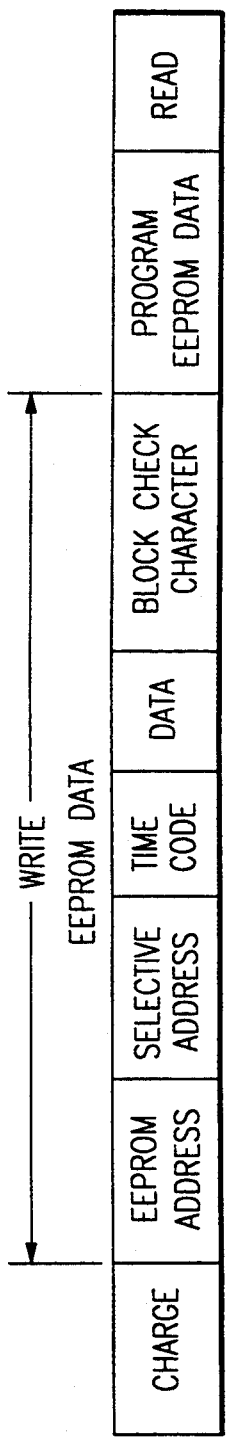
FIG. 2 shows the WRITE data sequence for the Selective Programing function.
Figure 3:
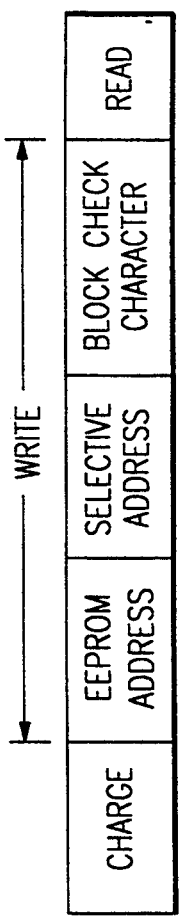
FIG. 3 shows the WRITE data sequence for the Selective Read function.

Therefore, when the EEPROM address 20 is received (first byte in the Write Data Frame as shown in FIGS. 2 and 3), the Control Logic circuit 22 addresses the page and receives the desired command (Read, Selective Read, Program or Lock). The Control Logic circuit 22 then receives the additional bytes of Selective Address, data and BCC, depending upon the received command. But before really programming or transmitting the addressed page i.e. executing the function, the block check is executed. Therefore, if Selective Addressing is desired (Command=Selective Read/Programming/Lock), the addressed page with the particular Selective Address is loaded out of the EEPROM circuit 26 and into the Input/Output (I/O) Register circuit 24. Because the incoming Selective Address and the Selective Address already existing in the I/O Register circuit 24 are shifted simultaneously, they are compared bit-by-bit by the Selective Addressing Comparator circuit 18. When all bits match, the Control Logic circuit 22 receives an enable signal from the Selective Addressing Comparator circuit 18. When all the bits do not match, the Control Logic circuit 22 receives a disable signal from the Selective Addressing Comparator Circuit 18 and the Control Logic circuit 22 discharges the charge capacitor C1 via transistor 32. Simultaneously, all incoming bits are shifted through the CRC generator 16, which had been set previously during power-on-reset to the start value which is defined by the Segment Code. After a predetermined number of incoming bits have been defined by the received command (the EEPROM Address comprises the Page Address and the Command), the CRC generator 16 generates a BCC and reports the block check result to the Control Logic circuit 22 and the desired function is enabled or disabled. Therefore, the desired function enablement is a function of both the enable signal from the Selective Addressing Comparator Circuit 18 in addition to the favorable block check result from the CRC generator circuit 16.

When the desired function is enabled, switch 30, controlled by the Control Logic circuit 22, switches the output of the I/O shift register circuit 24 from the Selective Addressing Comparator circuit 18 position to the input of the RF part circuit 14 and to the input of the CRC generator circuit 16. Subsequently, the addressed EEPROM page, comprising a Selective Address, a Time Code and other identification or sensor data, is transferred from the EEPROM circuit 26 to the input of the I/O shift register circuit 24 and the output shift from the output of the I/O shift register is initiated. The digital data modulates the RF signal of the resonant circuit 10 while being transmitted back to the R/W unit. In addition, the CRC generator circuit 16 is again reloaded with the Segment Code and initiated. The block check is initiated after the Frame block is transmitted. The FRAME bits are necessary in the R/W unit to prepare the receiver logic in the R/W unit to start the CRC generator circuit at the right time. The CRC generator circuit 16 generates another BCC from the digital data that comes from the output of the I/O shift register and transmits it back to the R/W unit along with the previously mentioned data. After transmission of the I/O shift register content, the CRC generator 16 is switched to a normal output shift mode and its content is transmitted consecutively. After transmission of the whole data frame, the charge capacitor 12 is discharged by the Control Logic circuit 22 which activates the transistor 32 to short-circuit the charge capacitor 12.

When the desired function is disabled, either because the wrong Selective Address was transmitted by the R/W unit or the wrong BCC was generated after reception of the command and other data from the R/W unit, the Control Logic circuit 22 initiates the discharge signal before executing the function.

The Test Logic circuit 28 is only relevant if it is possible to modify the Segment Code (stored in EEPROM 26) via a separate test and configuration interface, i.e. via the manufacturer during production and test of the transponder. It allows faster programming of the EEPROM (Segment Code, Selective Address, etc.) in a production line, without the use of application specific accessories. After the transponder is completely constructed, the test and configuration interface cannot be accessed.

Figure 4:
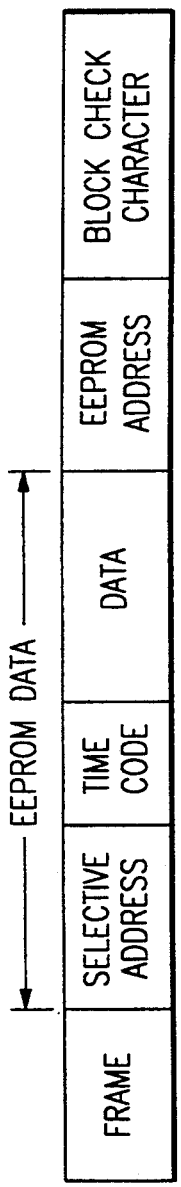
FIG. 4 shows the response (READ) data sequence.

FIGS. 2 through 4 will be explained in slightly more detail than was explained in the above paragraphs, showing possible embodiments of the data formats. FIG. 2 shows a Write Data Format for the Selective Programming function. The Selective Programming function consists of a Charge phase, a Write phase, a Program phase and a Read phase for the Programming function. During the Charge phase, the R/W unit is transmitting an RF power burst, in order charge up the storage capacitor C1 to power the transponder response. During the Write phase, the R/W unit transmits an EEPROM address, which comprises a command and a page address, the Selective Address and corresponding Time Code, other data and previously generated BCC to the transponder. During the program phase, the transponder is provided with another RF power burst in order to program into the EEPROM the Time Code and the data received during the Write phase. And then finally during the Read phase, the transponder sends EEPROM data (Selective Address, Time Code, Data), status information, the page address and BCCs back to the R/W unit(as shown in FIG. 4).

FIG. 3 shows the Write Data format for the Selective Read function. The Read function consists of a Charge phase, a Write phase, and a Read phase. All three phases are similar to the corresponding phases of the Selective Programming function, except that no Time Code and no Data is transmitted.

FIG. 4 shows the response data format of the Read phase previously described in the Selective Programming and Selective Read functions. However, one difference lies in the contents of the EEPROM address. The EEPROM address in the response data format comprises the addressed page's address and a Status Information instead of a Command as existed in the Read and Programming functions EEPROM address. The Status information tells the R/W unit whether the executed command was executed successfully.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim

1. A manipulation-free transponder comprising:
   a resonant circuit for receiving an RF signal comprising at least a selective address from a transmit/receive unit, having a CRC generator, and for transmitting a modulated RF signal to said transmit/receive unit;
   a memory circuit having at least one EEPROM cell for storing a unique selective address;
   a selective address comparator for comparing said received selective address with said selective address stored in said EEPROM memory circuit and for sending an enable signal in response to the received selective address matching the stored selective address;
   a control logic circuit for enabling a function in response to an enable signal from said selective address comparator circuit and a predetermined block check character; and
   a CRC generator for generating a predetermined block check character in response to the stored selective address and the received selective address matching and the start value of said CRC generator in said transponder and said transmit/receive unit being essentially the same and for sending said block check result to said control logic circuit.

2. The transponder of claim 1, wherein the control logic circuit accesses said start value of said CRC generator.

3. The transponder of claim 1, wherein further said selective address comparator circuit sends a disable signal to said control logic circuit in response to said received selective address not matching said stored selective address.

4. The transponder of claim 1, wherein further said control circuit sends a discharge signal in response to a disable signal from said selective address comparator circuit or in receiving a block check character other than said predetermined block check character.

5. The transponder of claim 4, further comprising:
   a rectifier for rectifying said RF signal;
   a storage capacitor for storing said rectified RF signal; and
   a transistor for discharging said storage capacitor in response to said discharge signal from said control logic circuit.

6. The transponder of claim 5, wherein said transistor discharges said storage capacitor via conduction of said transistor, thereby shorting said capacitor to ground.

7. The transponder of claim 1, wherein said start value of said CRC generator is stored in said EEPROM.

8. The transponder of claim 1, wherein said selective address can only be modified at a predetermined time code.

9. The transponder of claim 8, wherein said time code is stored in said EEPROM.

10. The transponder of claim 3, wherein said EEPROM circuit has a programming and locking function, but not an unlocking function.

* * * * *